Oct. 12, 1943.   R. H. TALBOT   2,331,746
ANTI-ABRASION COATING FOR PHOTOGRAPHIC FILM
Filed Feb. 13, 1942   2 Sheets-Sheet 1
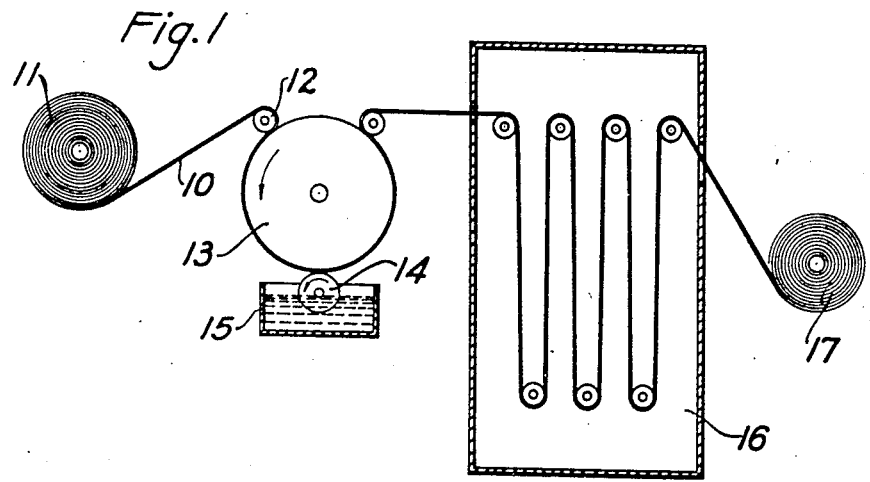
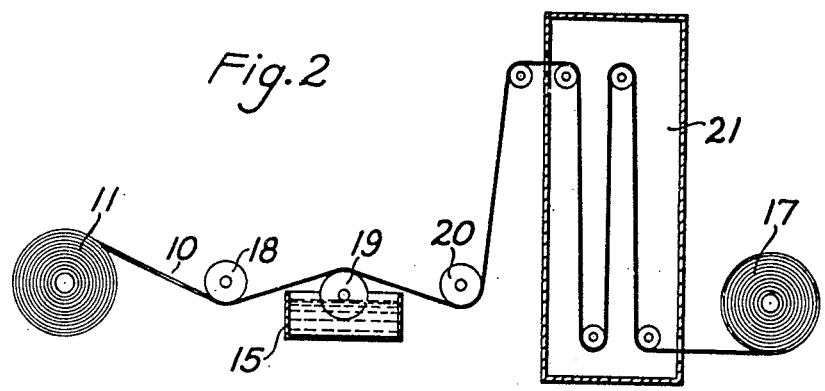
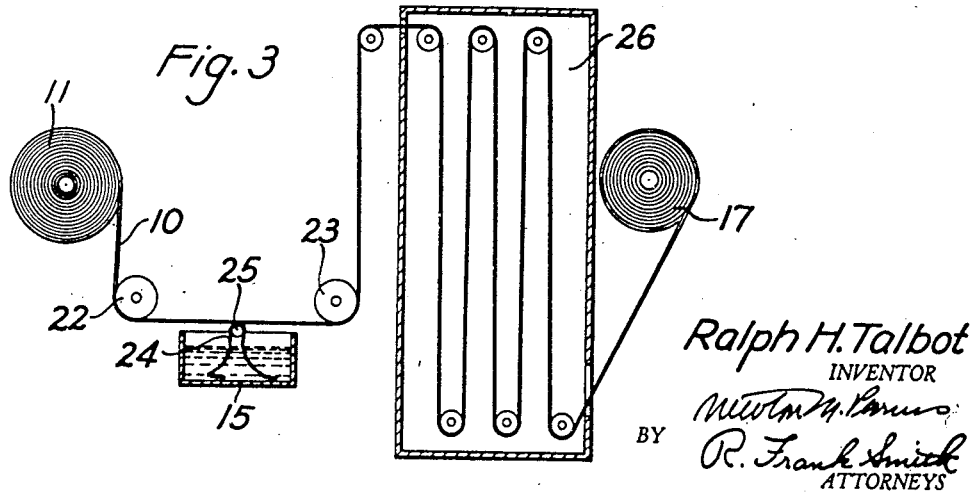
Ralph H. Talbot
INVENTOR
BY
ATTORNEYS Oct. 12, 1943.    R. H. TALBOT    2,331,746
ANTI-ABRASION COATING FOR PHOTOGRAPHIC FILM
Filed Feb. 13, 1942    2 Sheets-Sheet 2

Patented Oct. 12, 1943

2,331,746

UNITED STATES PATENT OFFICE 2,331,746

ANTIABRASION COATING FOR PHOTOGRAPHIC FILM

Ralph H. Talbot, Rochester, N. Y., assignor to Eastman Kodak Company, Rochester, N. Y., a corporation of New Jersey Application February 13, 1942, Serial No. 430,793

4 Claims. (Cl. 88—19.5)

This invention relates to a method for preventing abrasion of photographic film, particularly motion picture film, and to film coated so that abrasion is prevented.

This application is a continuation-in-part of Serial No. 302,578, filed November 2, 1939, which is a division of application Serial No. 242,031, now Patent No. 2,259,009, granted October 14, 1941.

There have been many attempts in the past to treat motion picture film either before or after processing in such a way as to make it less susceptible to scratching due to projection and handling. It is a well-known fact that, since the advent of sound film, it is necessary to discard prints due to scratches in the sound track, which either distort the sound or due to heavy ground noise make these films unusable, long before the normal life of the film has been reached.

Most of the methods heretofore have attempted to improve the scratch resistance by the applying to the film of various materials which would be less susceptible to scratching than is either the emulsion layer or the support layer of ordinary film. For instance, waxes in various forms have been applied. Whereas the application of wax will produce a more slipper film which will pass through a projector gate with greater ease and will also be less susceptible due to cinching of the film, the wax coat must be buffed to produce a coating of good appearance. It is very difficult to buff this wax coating onto motion-picture film without producing scratches. Furthermore, it is too slow and costly. There have been also many attempts to apply permanent lacquer coatings onto either one side or the other of motion-picture film. The only object of these coatings can be that they will scratch less easily than the normal film surface. Although these coatings may in some cases reduce somewhat the scratching due to abrasion, no coating has ever been found which will be entirely impervious to scratches due to foreign particles or contact with some part of a projection machine. Therefore, any satisfactory method for the permanent protection of photographic film must involve the removal of the damaged coating and its replacement with a new coating. This must be accomplished without impairing the quality of the photographic film or image.

The requirements for a satisfactory scratch-proofing coating are as follows:

1. The material used must be easily soluble in a solvent or solvents from which it may be applied to the picture and sound areas of processed motion picture film to give a glossy coating of the proper thickness without any imperfections such as "orange peel," etc., which will in any way impair the projected image.

2. The solvents from which these coatings are made must have just the right "bite" into both the emulsion side and the base side of motion picture film. If the solvents do not attack the underlayer at all, the coating will "peel." This causes the coating to lift on scratching, giving in many cases a white streak which is less desirable from a projection standpoint than a scratch. If the solvents attack the underlayer too strongly, the coating will not be removable. It is necessary, therefore, to adjust the attack of the solvents so that the coating is firmly held and yet can be easily removed.

3. The solutions must be capable of even application without excess wetting or retraction around the perforations. If the solvent wets too easily, the coat will run into the perforation area and result in a ragged edged coating. If the solvents do not wet sufficiently, there will be a retraction around each perforation leaving an uncoated area which will cause the coating to fluctuate in and out of the sound track area causing distortion of the sound.

4. The solvents must be capable of rapid removal with the aid of heat.

5. The coating must not be too greatly affected by high humidity. This would cause tackiness of the film and also make it very susceptible to finger printing.

6. The coat must be easily soluble in the standard splicing solvents. Since this coat will be applied to both sides of the motion picture film, it must be soluble in the splicing solvents, as otherwise it would have to be removed from the base side before a splice could be made.

7. The coat must not be adversely affected by the cleaning treatment employed in many film exchanges.

8. The coat must be easily removable. The coat must be easily removable in either ordinary tap water or water made slightly alkaline with ammonia or sodium carbonate, etc. It is preferable that the coat be removed simply by running the film through such a bath rather than by squeegeeing, since the latter often produces scratches or abrasion marks on the swollen and softened emulsion.

It is, therefore, an object of the present invention to provide an anti-abrasion coating which meets all or a majority of the above requirements.

Other objects will appear from the following description of my invention.

Materials which I have found suitable for use as protective coatings for photographic film, according to my invention, include ether-esters which contain a dicarboxylic acid radical, the carboxyl groups of which are linked by intervening carbon atoms and one of the carboxyl groups of which is joined to the cellulose, and water-soluble salts of these compounds. A preferred material is cellulose ether phthalate.

In the accompanying drawings,

Figs. 1, 2, 3 and 4 illustrate methods of applying a protective coating to photographic film according to my invention;

Figure 4:
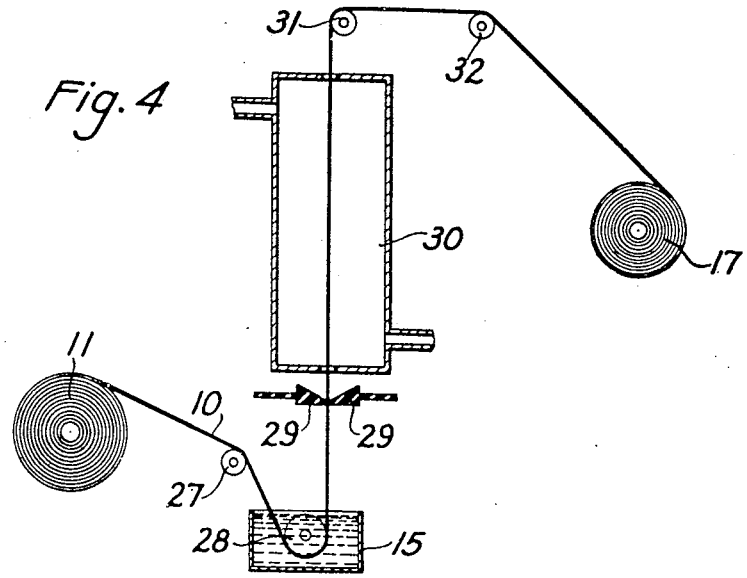
Figure 5:
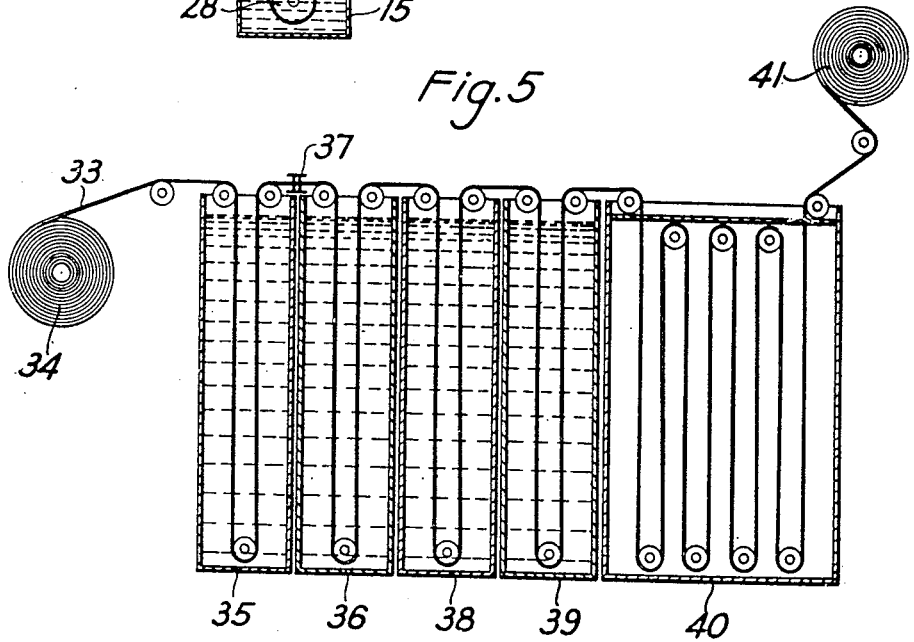
Fig. 5 illustrates a method of removing the protective coating from the film after it has become abraded.

The cellulose ether phthalate anti-abrasive layer is applied to the film in the form of a dilute solution followed by the subsequent removal of the carrier. The following methods show how dilute solutions may be evenly and smoothly applied to either side of photographic film, cellulose ether phthalate being referred to as a specific example:

A. By bead application

Figure 1 shows the method employed when the cellulose ether phthalate is applied from dilute solution by means of a liquid bead. Film 10 is drawn from stock roll 11 around idle roll 12 and onto a driven drum 13. At the bottom of drum 13 is located an applicator roll 14 revolving in a hopper 15 containing the solution of cellulose ether phthalate. The roll 14 is not in contact with the film on drum 13 but the solution is applied by a liquid bead which is formed between the two rolls by bringing roll 14 momentarily in contact with the film on drum 13 and then withdrawing it to such a distance that a liquid bead is maintained between the two rolls. The relative speeds of drum 13 and applicator roll 14 are adjusted so as to maintain a continuous bead once it has been formed. In case of a solution such as described in Example 1, these speeds were adjusted so as to give a peripheral speed for drum 13 of .28 feet per minute and drum 14 of 11 feet per minute. The coated photographic film is cured by passing through a drying cabinet 16 maintained at approximately 130° F. From drying cabinet 16 the film is wound on roll 17. The entire procedure is repeated in order to coat the reverse side of the film, or a subsequent application may be made in the same run to coat the opposite sides of the film. The speed of coating may vary within wide limits. The upper limit is governed by speed at which a satisfactory liquid bead may be maintained; that is to say, eventually a speed will be reached in which bubbles will form in the liquid bead and the vibration of the rapidly moving rolls will form liquid patterns on the applicator roll which will be transferred to the film. Satisfactory coatings have been obtained from 5 feet per minute to 150 feet per minute, which was the limit of our machine and not necessarily the upper limit coating speed.

B. By applicator roll

In Fig. 2, film 10 is drawn from stock roll 11 under idle roll 18 and over applicator roll 19, which is wet with the liquid in hopper 15. The film then passes under idle roll 20 and the solvents are then removed by evaporation in drying cabinet 24. This method is more simple than the bead application method since all rolls are free running, the film being moved by the wind-up mechanism driving roll 17. Care must be taken, however, to select solvents for the cellulose ether phthalate which will dry to a smooth, glossy coat in a drying cabinet. It should be noted that when rapid drying solvents are applied to film and the film passed through a cabinet in which there is rapid air circulation, the high evaporation rate of the solvents may cool the film to below room temperature even though heated air is used. This will often give rise to "blush" and other imperfections if improper solvents are used. At high rates of speed it may be necessary to remove excess liquid from roll 19 by means of a "doctor blade" or other means before the roll comes in contact with the film, otherwise liquid may carry through and form an uneven bead at the point where the film leaves the applicator roll.

C. By wick

In the foregoing methods of application on perforated 35 mm. motion picture film, only the area between the perforations can be coated. This is due to the fact that in the case of a bead or applicator roll the excess liquid would run through the perforations and produce a smear on the opposite side of the film. In the case of the wick application described in Figure 3 the entire area of perforated motion picture film may be smoothly and evenly coated at any desired rate of speed. Film 10 is drawn from stock roll 11 under two rolls, 22 and 23, which are placed so as to cause the film to impinge on a wick 24 wrapped around a stationary rod 25. The ends of the wick dip into the solution in hopper 15 and feed the solution to the moving film 10. Since there is very little excess liquid at the point of application, wetting through the perforations is avoided. The film is dried in the usual manner, in drying cabinet 26 and passes to the take-up roll 17. The speed of coating in this case is limited only by the thickness of the coat desired. At very rapid speeds the thickness of the coat will be decreased due to the inability of the wick to transfer the liquid as rapidly as it has been removed.

In place of the stationary wick I may also use a plush- or felt-covered roll which is driven slowly in a direction opposite to that of the film travel. In this case the thickness of the coating is independent of the film speed, as the speed of the roller wick may be increased in the same order as the film speed is raised.

D. By immersion

In the foregoing methods only one side of the photographic film is coated at a time, whereas if the film is immersed in the coating liquid and the excess removed by some suitable means, the cellulose ether phthalate layer can be applied to both sides of the photographic film at the same time. In Figure 4, film 10 is drawn from stock roll 11 over roll 27 and around roll 28 which is immersed in the coating liquid, in hopper 15. The film now passes through two air squeegees 29 which remove the excess liquid from the surface of the film as well as freeing the perforations from entrapped liquid. The film must then pass vertically through a long drying cabinet 30 so that the coat is entirely dry before the film touches the rollers 31 and 32, and take-up roll 17.

I may use the phthalates of cellulose ethers, such as methyl cellulose phthalate, made according to the method described in U. S. Patent No. 2,126,460, granted August 9, 1938, to Leo B. Genung. I prefer to use an ethyl cellulose phthalate of about 25% phthalyl content, although ethyl cellulose phthalates whose phthalyl content is from about 10% to about 45% may be used. The preferred ether phthalates are those made from cellulose ethers having not more than about two ether groups per C$_6$ cellulose unit. In the case of cellulose ethyl ether, about 41% ethoxyl corresponds to 2.02 ethoxyl groups per C$_6$ cellulose unit. The upper limit of ethoxyl groups in the ethyl cellulose phthalates which I have found suitable is about 43%. This corresponds to about 2.12 ethoxyl groups per C$_6$ cellulose unit, and I have therefore concluded that in the case of other ethers, such as methyl or propyl ethers, the number of ether groups should not exceed about 2 per C$_6$ cellulose unit. Where I refer in the claims to "about 2 ether groups per C$_6$ cellulose unit" I mean to include the limit of 2.12 groups referred to above.

Ethyl cellulose phthalate is soluble in acetone, dioxane, methyl Cellosolve, simple alcohols such as methyl and ethyl alcohols, acetic acid, benzene, and in mixtures of dioxane and water containing as high as 35% water, in methyl Cellosolve-water mixtures containing as high as 20% water, and in methyl alcohol-water mixtures containing as high as 15% water. It is insoluble in water and chlorinated hydrocarbons, such as carbon tetrachloride and tetrachloroethane.

*Example 1*

35 mm. nitrate motion picture film was coated on both emulsion and support sides with ethyl cellulose phthalate consisting of:

| | Grams |
|---|---|
| Ethyl cellulose phthalate | 5 |
| Acetone | 22 |
| Methyl Cellosolve | 10 |
| Ethyl alcohol (95%) | 58 |
| Water | 10 |

*Example 2*

Cellulose nitrate support motion picture film was coated on both emulsion and support sides by the bead method referred to above with the following solution of ethyl cellulose phthalate:

| | Grams |
|---|---|
| Ethyl cellulose phthalate | 3 |
| Toluene | 66.4 |
| Denatured ethyl alcohol | 34.1 |
| N-butyl alcohol | 2.5 |

*Example 3*

Cellulose nitrate support motion picture film was coated on both emulsion and support sides by the wick method described above with ethyl cellulose phthalate solution of the following composition:

| | Grams |
|---|---|
| Ethyl cellulose phthalate | 6 |
| Toluene | 66.4 |
| Denature ethyl alcohol | 34.1 |
| N-butyl alcohol | 2.5 |
| Phenyl phthalate | 0.9 |

*Example 4*

The following solution of ethyl cellulose phthalate was used to coat finished motion picture film by the bead method referred to above and was found to result in less "blushing" of the coating at high relative humidity:

| | Grams |
|---|---|
| Ethyl cellulose phthalate | 3 |
| Toluene | 57.4 |
| "Bayway naphtha"—an aliphatic petroleum distillate, boiling point 75°–112° C | 24.6 |
| Isopropyl alcohol | 10 |
| N-butyl alcohol | 8 |
| Glacial acetic acid | 0.1 |

*Example 5*

The same solution is suitable for use by the wick application method except that 6 grams of ethyl cellulose phthalate should be used instead of 3 grams as in Example 4.

The phthalates of the cellulose ethers are soluble in dilute alkalies and these materials are suitable, under certain conditions, as film protective coatings. For example, ammonium and soluble amine salts may be used. These aqueous salt mixtures may be used directly as coatings or they may be diluted with solvents such as the simple aliphatic alcohols. The solutions of these materials may have some affinity for the layers over which they are applied, and this may be accomplished by the use of a certain amount of organic solvent where the aqueous salts are applied to the support side of photographic film. Where they are applied to the emulsion side only, the use of organic solvents is not necessary. In the case of the aqueous salt solutions diluted with alcohol, the water has an affinity for the emulsion side and the alcohol has a slight affinity for the support side sufficient to prevent peeling of the coating.

When cellulose ether phthalates are used in the acid form, solvents may be used which are completely inactive to the support and, therefore, do not affect the curl of the film. Film lacquers produced in this way are easier to remove from the support than those in which a solvent has been used which has some action on the support.

Films treated in the above manner show an increased resistance to abrasion which in itself is desirable. Furthermore, by adjusting the thickness of the layer applied to the surface of the film, the abrasion marks ordinarily encountered in the handling of motion picture film can be restricted to the removable layer and thus prevent any damage to the film itself. It naturally follows that on removal of the coat bearing the abrasion marks and its replacement by a fresh coat, the film is perfectly reconditioned.

The removable coatings of the cellulose ether phthalates described above may be used in conjunction with additional coatings of materials which are not in themselves soluble in dilute alkalies but which give protection against scratching and finger-printing. In this way any materials of very low moisture susceptibility can be used, which, if applied directly to film, would not offer the abrasion protection contemplated by the present invention since they could not be removed. Materials such as synthetic resins may in this manner be coated over the layers of the phthalates of the cellulose ethers to afford complete protection.

My invention is susceptible of numerous modifications, not specifically mentioned in the present description, for example, film base other than that composed of cellulose nitrate may be coated according to my invention, such as cellulose acetate, cellulose acetate propionate, and other cellulose organic acid ester film supports, or supports of synthetic resins. The coating material may consist of any cellulose or ether-ester which contains a dicarboxylic acid radical, the carboxyl groups of which are linked by intervening carbon atoms and one of the carboxyl groups of which is joined to the cellulose. These compounds include cellulose ether-esters, such as methyl cellulose phthalate and ethyl cellulose phthalate, or their water-soluble salts. My invention is to be taken as limited only by the scope of the appended claims.

I claim:

1. A photographic film containing a visible image and free from permanent abrasion, comprising a developed, fixed, washed, and dried photographic film having thereon a coating of a cellulose ether containing a dicarboxylic acid radical, the carboxyl groups of which are linked by intervening atoms, one of the carboxyl groups being joined to the cellulose, and said ether having not more than about 2 ether groups per $C_6$ cellulose unit.

2. A photographic film comprising a cellulose nitrate support having thereon an emulsion layer containing a visible photographic image, and a coating of a cellulose ether containing a dicarboxylic acid radical, the carboxyl groups of which are linked by intervening atoms, one of the carboxyl groups being joined to the cellulose, and said ether having not more than about 2 ether groups per $C_6$ cellulose unit.

3. A photographic film comprising a cellulose nitrate support having thereon an emulsion layer containing a visible photographic image, and a coating of a cellulose ether phthalate containing not more than about 43% ethoxyl and which is removable in a 1% solution of sodium carbonate; said film being free from permanent abrasion.

4. A photographic film comprising a cellulose nitrate support having thereon an emulsion layer containing a visible photographic image and a coating of ethyl cellulose phthalate containing not more than about 43% ethoxyl and which is removable in a 1% solution of sodium carbonate, said film being free from permanent abrasion.

RALPH H. TALBOT.